(12) United States Patent
Vicente, Jr.

(10) Patent No.: US 8,727,335 B1
(45) Date of Patent: May 20, 2014

(54) GEAR ASSEMBLY AND ELECTRONIC DEVICE USING THE SAME

(71) Applicant: Domingo Abao Vicente, Jr., Singapore (SG)

(72) Inventor: Domingo Abao Vicente, Jr., Singapore (SG)

(73) Assignees: Cal-Comp Precision (Singapore) Limited, Singapore (SG); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 13/727,602

(22) Filed: Dec. 27, 2012

(30) Foreign Application Priority Data

Nov. 22, 2012  (SG) .................................. 201208600

(51) Int. Cl.
*B65H 5/00* (2006.01)
*B65H 3/06* (2006.01)
*F16D 23/12* (2006.01)
*F16D 43/02* (2006.01)
*F16D 43/06* (2006.01)

(52) U.S. Cl.
USPC ..................... 271/10.13; 271/114; 271/10.04; 192/46; 192/105 CD

(58) Field of Classification Search
USPC ........................... 271/114, 264, 10.04, 10.13; 192/105 CD, 46
See application file for complete search history.

(56) References Cited

U.S. PATENT DOCUMENTS

| | | | |
|---|---|---|---|
| 4,754,961 A | | 7/1988 | Tokuda et al. |
| 5,222,724 A | * | 6/1993 | Hirano et al. ............... 271/10.11 |
| 5,240,241 A | * | 8/1993 | Kawazoe ........................ 271/114 |
| 5,358,230 A | * | 10/1994 | Ikemori et al. ................ 271/114 |
| 5,472,287 A | | 12/1995 | Hasegawa et al. |
| 5,527,028 A | * | 6/1996 | Ishikawa ........................ 271/114 |
| 5,560,460 A | * | 10/1996 | Ezawa ............................ 192/46 |
| 7,070,035 B2 | * | 7/2006 | Wians ..................... 192/105 CD |
| 7,128,315 B2 | * | 10/2006 | Tsunematsu ................... 271/114 |
| 7,281,620 B2 | * | 10/2007 | Wolner et al. .............. 192/223.1 |
| 7,600,935 B2 | | 10/2009 | Koba et al. |
| 8,550,449 B2 | * | 10/2013 | Vicente et al. ................ 271/109 |
| 2007/0062775 A1 | * | 3/2007 | Bird et al. ........................ 192/46 |
| 2007/0089960 A1 | * | 4/2007 | Kanehisa ........................ 192/64 |
| 2007/0131509 A1 | * | 6/2007 | Kimes ............................. 192/46 |
| 2008/0169599 A1 | | 7/2008 | Lam et al. |
| 2013/0025993 A1 | * | 1/2013 | Lin ................................. 192/46 |

* cited by examiner

*Primary Examiner* — Patrick Cicchino
(74) *Attorney, Agent, or Firm* — Jianq Chyun IP Office

(57) ABSTRACT

A gear assembly including a driving gear and a driven gear and an electronic device are provided. The driving gear includes a pawl pivoted on a first surface and an elastic member disposed in a slot of the driving gear. The driven gear includes a ratchet disposed on a second surface facing the first surface. When the driving gear rotates with a driving speed along a driving direction, a centrifugal force is generated to drive the pawl moving to a clutching position to be engaged with the ratchet and drives the driven gear rotating with the driving gear. When the driving gear rotates with a nominal speed slower than the driving speed along a direction opposite to the driving direction, the engagement between the pawl and the ratchet is released, and the pawl is back to a nominal position so the driven gear does not rotate with the driving gear.

20 Claims, 4 Drawing Sheets

GEAR ASSEMBLY AND ELECTRONIC DEVICE USING THE SAME

CROSS-REFERENCE TO RELATED APPLICATION

This application claims the priority benefit of Singapore application serial no. 201208600-5, filed on Nov. 22, 2012. The entirety of the above-mentioned patent application is hereby incorporated by reference herein and made a part of this specification.

BACKGROUND

Field of the Application

Along with the widespread of information products, various information products are developed, and the information products have a general trend of diversity. However, regarding image display methods of a computer, displays and printers are mainly used as image output devices. Wherein, the printers can be approximately categorized into three types of point matrix printers, inkjet printers and laser printers. Taking the laser printer as an example, it has advantages of high printing quality, fast printing speed, and low average cost of consumables, etc., so that the laser printer is one of the popular printers in the market.

A paper tray of the printer generally has a pick roller to assist the paper picking, so that the paper can be smoothly fed to the printer for printing. Generally, the paper tray only has one set of the pick roller, and the pick roller is fixed in a specific position in the paper tray, so that it cannot be adjusted according to a size or a position of the paper.

The pick roller is usually designed to positively drive in one direction and provide substantially no torque in the other direction so as to avoid paper jam. However, the motor of the printer rotates in both directions during the operation period such as copying or scanning, etc. Thus, the motor may accidentally drive the pick roller to rotate during the operation period which causes paper jam or even operation error.

SUMMARY OF THE INVENTION

Accordingly, the present invention is directed to a gear assembly wherein the driven gear thereof is configured to rotate unidirectionally at certain driving speed.

The present invention is directed to an electronic device wherein the paper feed roller of the paper feed module is configured to rotate unidirectionally at certain driving speed.

The present invention provides a gear assembly including a driving gear and a driven gear. The driving gear is adapted to rotate along an axis. The driving gear includes at least one pawl and at least one elastic member. The pawl is pivoted on a first surface of the driving gear. The elastic member is respectively disposed in at least one slot of the driving gear, wherein one end of the elastic member is fixed in the slot and another end of the elastic member is connected to the pawl. The driven gear includes a ratchet having a plurality of teeth and disposed on a second surface facing the first surface, wherein the ratchet is adapted to be engaged with the pawl. When the driving gear rotates with a driving speed along a driving direction, a centrifugal force is generated to drive the pawl to move from a nominal position to a clutching position, such that the at least one pawl is engaged with the at least one tooth of the ratchet and drives the driven gear to rotate with the driving gear. When the driving gear rotates with a nominal speed slower than the driving speed along a releasing direction opposite to the driving direction, the engagement between the pawl and the ratchet is released and the pawl is back to the nominal position so the driven gear does not rotate with the driving gear.

The present invention provides an electronic device including a body and a paper feed module. The paper feed module disposed in the body includes a paper tray, a paper feed path and a gear assembly. The paper tray is adapted to stack papers thereon. The paper feed path is connected to the paper tray. The gear assembly disposed on the paper feed path includes a driving gear and a driven gear. The driving gear is adapted to rotate along an axis. The driving gear includes at least one pawl and at least one elastic member. The pawl is pivoted on a first surface of the driving gear. The elastic member is respectively disposed in at least one slot of the driving gear, wherein one end of the elastic member is fixed in the slot and another end of the elastic member is connected to the pawl. The driven gear includes a ratchet having a plurality of teeth and disposed on a second surface facing the first surface, wherein the ratchet is adapted to be engaged with the pawl. When the driving gear rotates with a driving speed along a driving direction, a centrifugal force is generated to drive the pawl to move from a nominal position to a clutching position, such that the at least one pawl is engaged with the at least one tooth of the ratchet and drives the driven gear to rotate with the driving gear. When the driving gear rotates with a nominal speed slower than the driving speed along a releasing direction opposite to the driving direction, the engagement between the pawl and the ratchet is released and the pawl is back to the nominal position so the driven gear does not rotate with the driving gear.

According to an embodiment of the present invention, the driving speed is between 99 rpm and 110 rpm.

According to an embodiment of the present invention, the nominal speed is between 30 rpm and 50 rpm.

According to an embodiment of the present invention, after the pawl is engaged with the ratchet, the rotating speed of the driving gear is decreased from the driving speed to the nominal speed while the driving gear keeps on rotating along the driving direction, and the pawl is remain engaged with the ratchet.

According to an embodiment of the present invention, the gear assembly further comprises a driven pivot, wherein the driven pivot is connected to the driven gear such that the driven pivot rotated with the driven gear.

According to an embodiment of the present invention, the driving gear further comprises a first through hole and the driven gear further comprises a second through hole and a lock part, the driven pivot is engaged with the first through hole and the second through hole respectively and is locked with the lock part, such that the driven pivot rotates with the driven gear.

According to an embodiment of the present invention, the driven pivot comprises a groove and the driving gear comprises a bump disposed on an inner wall of the first through hole and engaged with the groove, such that the bump moves along the groove when the driving gear rotates relatively to the driven gear.

According to an embodiment of the present invention, the driving gear comprises a groove disposed around an inner wall of the first through hole and the driven pivot comprises a bump engaged with the groove, such that the bump moves along the groove when the driving gear rotates relatively to the driven gear.

According to an embodiment of the present invention, the driving gear further comprises a top stopper and a bottom stopper, wherein when the pawl is driven to move to the clutching position, the pawl leans against the top stopper to keep the pawl engaged with the ratchet, when the pawl is back to the nominal position, the pawl leans against the bottom stopper to keep the pawl remaining at the nominal position.

According to an embodiment of the present invention, the diameters of the driving gear and the driven gear both are about 30 mm.

Based on the above mentioned description, the present invention provides the driven gear can only be driven by the driving gear when the driving gear rotates with certain driving speed, so as to avoid the driven gear driven by the driving gear accidentally and causes the paper jam or operation error of the electronic device. Moreover, the elastic member configured to maintain the pawl of the driving gear at the nominal position when the driven gear is not driven by the driving gear is disposed in the slot of the driving gear, so no extra volume is added, and the size of the gear assembly can remain compact. Therefore, the present invention not only can avoid paper jam or operation error of the electronic device, but also maintain the compact size of the gear assembly and the electronic device using the gear assembly.

In order to make the aforementioned and other objectives, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
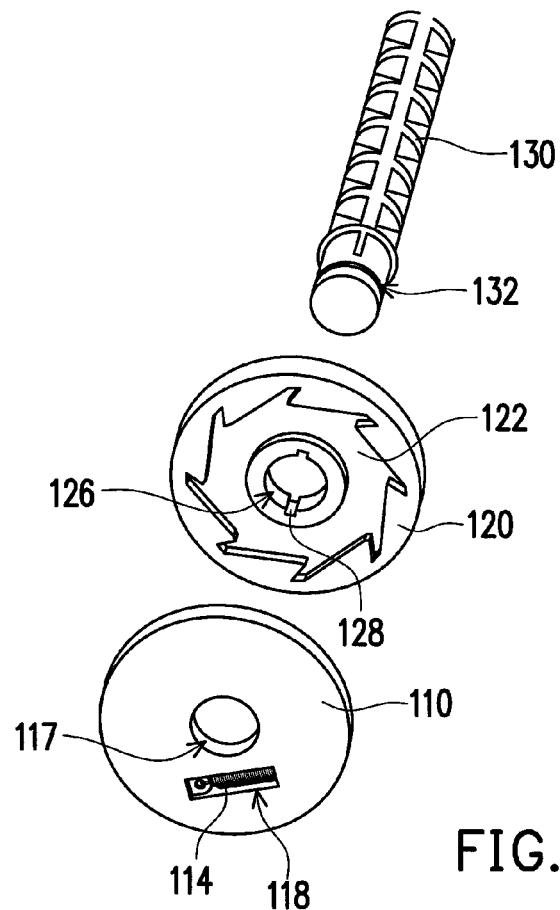
FIG. 1 is an exploded view of a gear assembly according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
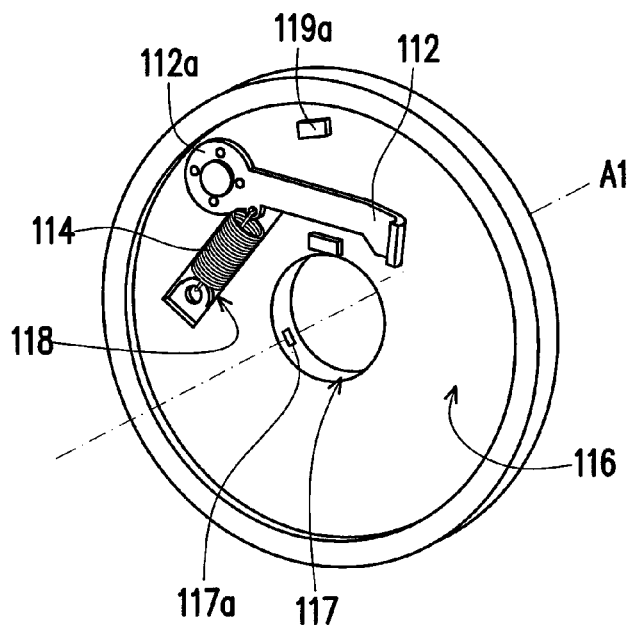
FIG. 2 is a schematic view of the driving gear of FIG. 1.
Figure 3:
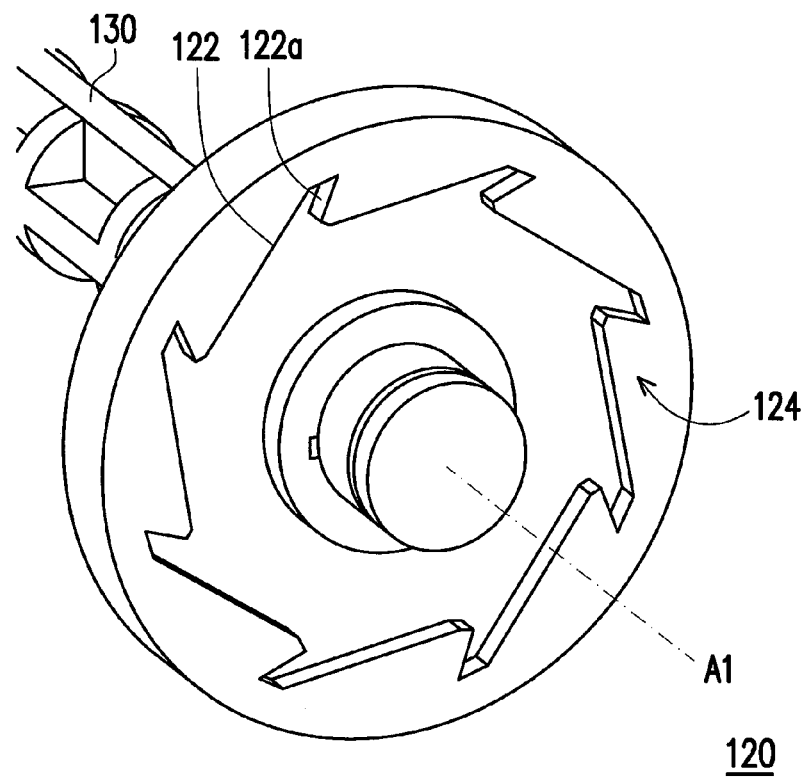
FIG. 3 is a schematic view of the driven gear of FIG. 1.

FIG. 1 is an exploded view of a gear assembly according to an embodiment of the invention. FIG. 2 is a schematic view of the driving gear of FIG. 1. FIG. 3 is a schematic view of the driven gear of FIG. 1. Please refer to FIG. 1 to FIG. 3, the gear assembly 100 of the present embodiment includes a driving gear 110 and a driven gear 120. The driving gear 110 is adapted to rotate about an axis A1. The driving gear 110 includes at least one pawl 112 (one is illustrated herein) and at least one elastic member 114. The pawl 112 is pivoted on a first surface 116 of the driving gear 110 so the pawl 112 is adapted to rotate about a pivoted point 112a.

The elastic member 114 is respectively disposed in at least one slot 118 of the driving gear 110, wherein one end of the elastic member 114 is fixed in the slot 118 and another end of the elastic member 114 is connected to the pawl 112. Thus, when the pawl 112 rotates about the pivot point 112a and is away from the center of the driving gear 110, an elastic force is generated by the elastic member 114 to pull the pawl toward the center of the driving gear 110. Moreover, the elastic member 114 is disposed in the slot 118, so no extra volume is added to the driving gear 110. The driven gear 120 includes a ratchet 122 having a plurality of teeth 122a and disposed on a second surface 124 facing the first surface 116. The at least one pawl 112 is adapted to be engaged with at least one of the teeth 122a of the ratchet 122.

Figure 4:
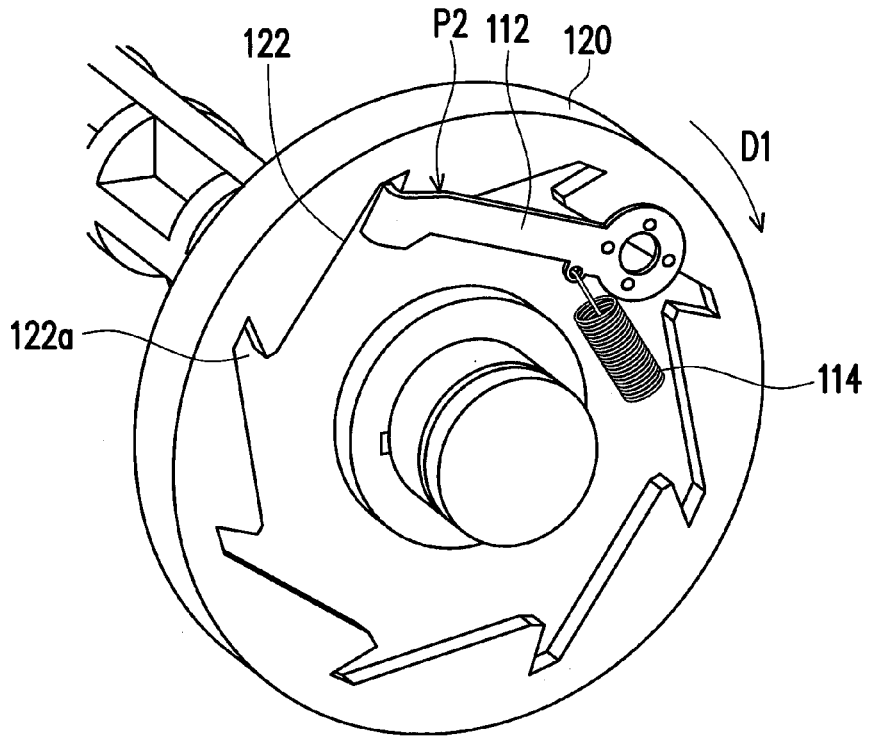
FIG. 4 is a schematic view of the gear assembly when the pawl is at the clutching position.
Figure 5:
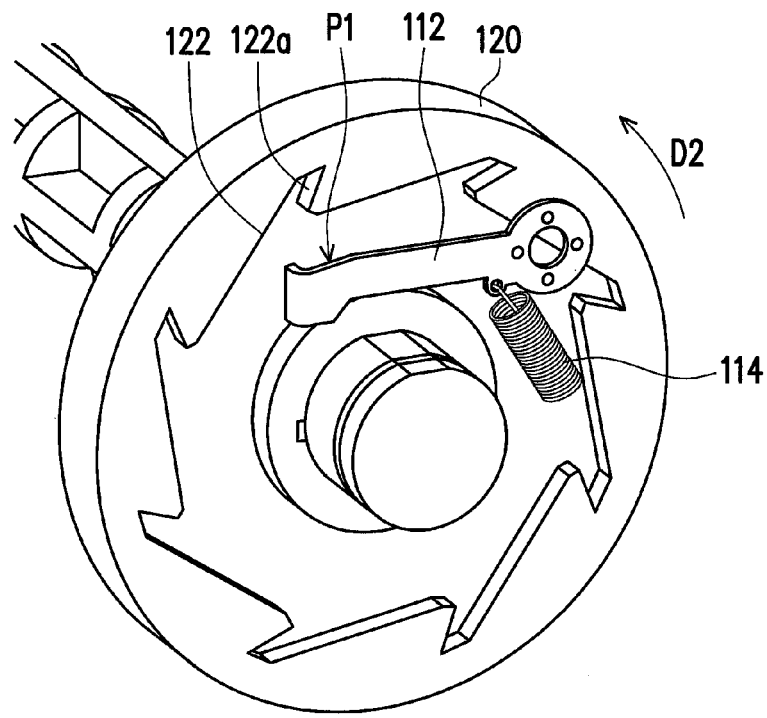
FIG. 5 is a schematic view of the gear assembly when the pawl is at the nominal position.

FIG. 4 is a schematic view of the gear assembly when the pawl is at the clutching position. FIG. 5 is a schematic view of the gear assembly when the pawl is at the nominal position. It is noted that, only the pawl 112 and the elastic member 114 are illustrated in FIG. 4 and FIG. 5, and the main body of the driving gear 110 is omitted herein for clearer illustration. Referring to FIG. 4 and FIG. 5, when the driving gear 110 rotates with a driving speed along a driving direction D1, a centrifugal force is generated to drive the pawl 112 to move from a nominal position P1 to a clutching position P2, such that the at least one pawl 112 catches the first tooth 122a of the ratchet 122 it encounters and is engaged with the tooth 122a as shown in FIG. 4, so as to drive the driven gear 120 to rotate with the driving gear 110. After the pawl 112 is engaged with the ratchet 122, the rotating speed of the driving gear 110 is decreased from the driving speed to a nominal speed while the driving gear 110 keeps on rotating along the driving direction D1, and the pawl 112 is remain engaged with the ratchet 122, so the driven gear 120 is still driven by the driving gear 110.

When the driving gear 110 rotates with the nominal speed along a releasing direction D2, the engagement between the pawl 112 and the ratchet 122 is released. Also, because the nominal speed is slower than the driving speed, the centrifugal force is decreased, so the pawl 112 is back to the nominal position P1, and the driven gear 120 is no longer driven by the driving gear 110. The elastic member 114 is configured to apply the elastic force to the pawl 112 to maintaining the pawl 112 at the nominal position. In the present embodiment, the diameters of the driving gear 110 and the driven gear 120 both are about 30 mm, the driving speed is between 99 rpm and 110 rpm, and the nominal speed is between 30 rpm and 50 rpm. In the present embodiment, 99 rpm is the critical driving speed for the gear assembly 100 of the present embodiment, in other words, if the rotating speed of the driving gear 110 is below 99 rpm, the pawl 112 cannot be engaged with the ratchet 122 to drive the driven gear 120 rotating with the driving gear 120. The centrifugal force depends on the size and rotating speed of the driving gears 110, so the critical driving speed may change according to the size of the driving gear 110. The present invention is not limited herein. The releasing direction D2 is opposite to the driving direction D1, for example, the driving direction D1 is clockwise rotation and the releasing direction D2 is counter-clockwise rotation.

Referring to FIG. 1 and FIG. 3, in the present embodiment, the gear assembly 100 further includes a driven pivot 130 connected to the driven gear 120. The driving gear 110 further includes a first through hole 117 and the driven gear 120 further includes a second through hole 126 and a lock part 128. The driven pivot 130 is engaged with the first through hole 117 and the second through hole 126 respectively and is locked with the lock part 128 of the driven gear 120, such that the driven pivot 130 rotates with the driven gear 120. Moreover, referring to FIG. 2 and FIG. 3, the driven pivot 130 includes a groove 132 and the driving gear 110 includes a bump 117a disposed on an inner wall of the first through hole 117 and engaged with the groove 132, such that the bump 117a moves along the groove 132 when the driving gear 110 rotates relatively to the driven gear 120 and engagement between the bump 117a and the groove 132 restrains the movement of the driving gear 110 along the axis A1. The present embodiment is only for illustration, in other not-shown embodiment, the driving gear 110 can include a groove disposed around an inner wall of the first through hole 117 and the driven pivot 130 includes a bump engaged with the groove. As long as the driven pivot 130 is adapted to rotate relatively to the driving gear 110 and does not move relatively to the driving gear 110 along the axis A1, the present invention does not limit the engagement method between the driven pivot 130 and the driving gear 110.

Referring to FIG. 2, FIG. 4 and FIG. 5, the driving gear 110 further includes a top stopper 119a and a bottom stopper 119b. When the pawl 112 is driven to move to the clutching position P2, the pawl 112 leans against the top stopper 119a to keep the pawl 112 engaged with the ratchet 122. When the pawl 112 is back to the nominal position P1, the pawl 112 leans against the bottom stopper 119b to keep the pawl 112 remaining at the nominal position P1 and not to touch the driven pivot 130.

Figure 6:
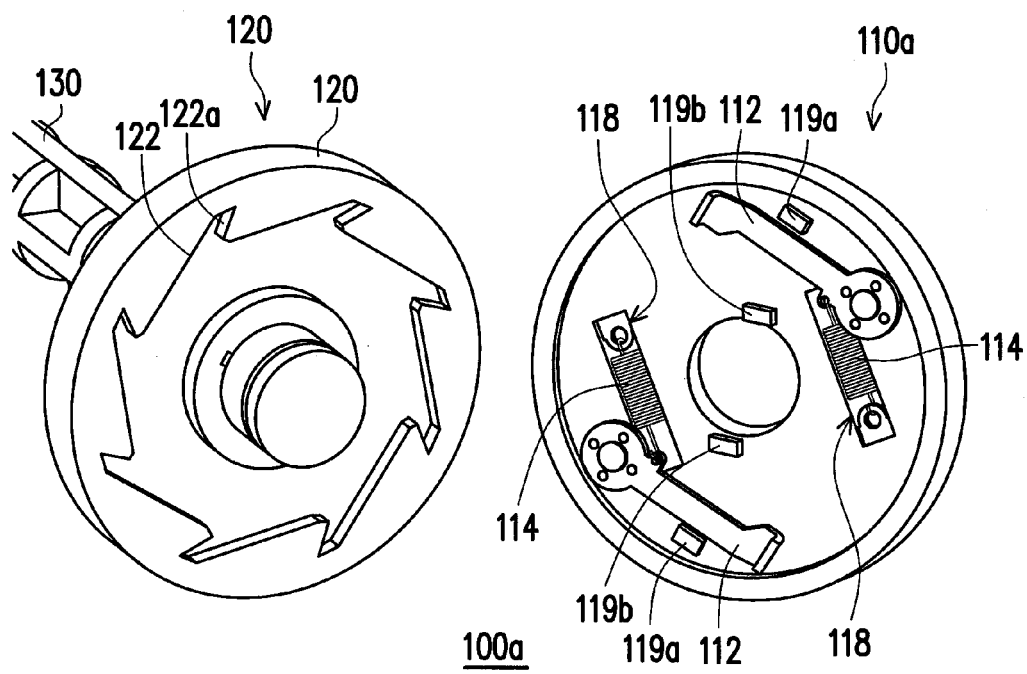
FIG. 6 is a schematic view of the driving gear and the driven gear according an embodiment of the invention.

FIG. 6 is a schematic view of the driving gear and the driven gear according an embodiment of the invention. Referring to FIG. 6, in the present embodiment, the gear assembly 100a of the present embodiment is similar to the gear assembly 100 in FIG. 1 to FIG. 5. Also, the gear assembly 100a are capable of achieving similar effects as the gear assembly 100 in FIG. 1 to FIG. 5. The same reference number indicate the similar parts, and the repeated description thereof will be omitted. In the present embodiment, the differences between the gear assembly 100a and the gear assembly 100 is that the driving gear 110a includes two pawls 112, two corresponding elastic member 114, two corresponding slots 118 and two sets of stopper 119a, 119b disposed correspondingly to the two pawls 112. The pawls 112 respectively catches and engaged with two corresponding teeth 122a of the ratchet 122 when the driving gear 110a rotates with the driving speed along the driving direction to drive the driven gear 120 rotating with the driving gear 110a. The present invention does not limit the number of the pawls 112, and the number of the elastic member 114, slot 118 and the top and bottom stoppers 119a, 119b corresponds to the number of the pawls 112.

With the design discloses above, the driven gear 120 can only be driven by the driving gear 110 when the driving gear 110 rotates with certain driving speed, so as to avoid the driven gear 120 driven by the driving gear 110 accidentally and causes the operation error. Moreover, the elastic member 114 configured to maintain the pawl 112 of the driving gear 110 at the nominal position P1 when the driven gear 120 is not driven by the driving gear 110 is disposed in the slot of the driving gear 110, so no extra volume is added, and the size of the gear assembly 100 can remain compact.

Figure 7:
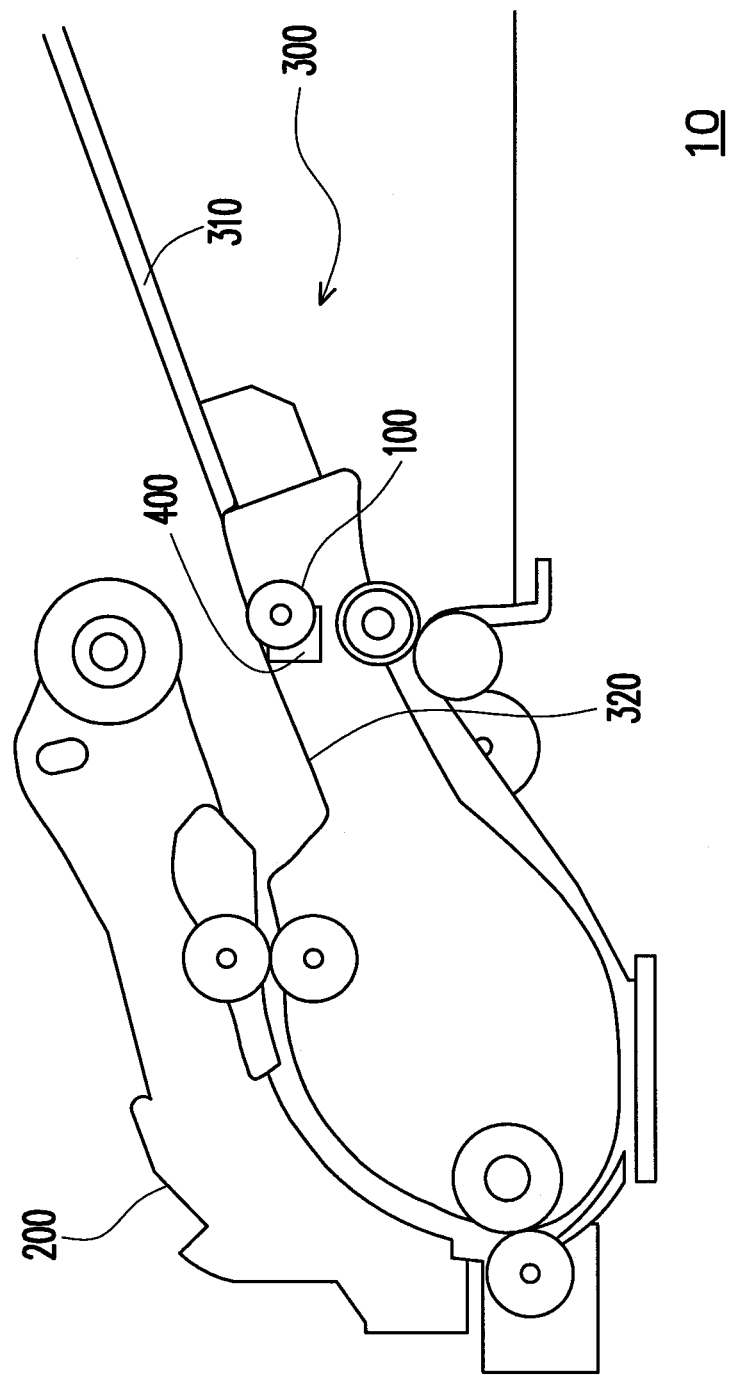
FIG. 7 illustrates a cross-section view of an electronic device according to an embodiment of the invention.

FIG. 7 illustrates a cross-section view of an electronic device according to an embodiment of the invention. Referring to FIG. 7, the gear assembly 100 described above is suitable for being used in a paper feed module 300 of an electronic device 10. The electronic device 10 can be a printer, a scanner, a multifunction peripheral, etc. In the present embodiment, the electronic device 10 is an automatic document feed scanner (ADF scanner), but it should be known that the embodiment is only for illustrating, not for limiting the present invention. The electronic device 10 comprises a body 200 and a paper feed module 300. The paper feed module 300 is disposed in the body 200 and includes a paper tray 310 for stacking papers thereon, a paper feed path 320 connecting to the paper tray 310, and the above-mentioned gear assembly 100 disposed on the paper feed path 320 for feeding the paper from the paper tray 310 into the electronic device 10 through the paper feed path 320. The gear assembly 100 of the present embodiment is substantially the same with the gear assembly 100 in FIG. 1 to FIG. 5. The same reference numbers indicate the similar parts, and the repeated description thereof will be omitted.

Referring to FIG. 1 and FIG. 7, when the gear assembly 100 is used in the paper feed module 300 of the electronic device 10, the electronic device 10 further includes a motor 400 for driving the driving gear 110. The driven pivot 130 of the gear assembly 100 can be connected to the paper feed roller to drive the paper feed roller to rotate in the driving direction D1 when the driving gear 110 rotates with the driving speed. When the driving gear 110 rotates with a driving speed along the driving direction D1, the pawl 112 of the driving gear 110 is engaged with the ratchet 122 of the driven gear 120 to drive the driven gear 120 rotating with the driving gear 110 along the driving direction, for example, clockwise rotation. In the present embodiment, the driving speed is between 99 rpm and 110 rpm, and 99 rpm is the critical driving speed for the gear assembly 100 of the present embodiment. In other words, if the rotating speed of the driving gear 110 is below 99 rpm, the driving gear 110 cannot drive the driven gear 120 to rotate. After the pawl of the driving gear 110 is engaged with the ratchet 122, the rotating speed of the driving gear 110 may be decreased from the driving speed to a nominal speed while the driving gear 110 keeps on rotating along the driving direction, and the driven gear 120 is still driven by the driving gear 110.

When the electronic device 10 performs normal operations, such as photo-copying, scanning, printing, etc., the motor 400 of the electronic device 10 drives the driving gear 110 rotating in both the driving direction and the releasing direction, for example, clockwise rotation and counter-clockwise rotation, which may cause the paper feed roller driven by the driven gear 120 rotates during the normal operation period and leads to paper jam or operation error. Therefore, to release the engagement of the pawl 112 and the ratchet 122 when the electronic device 10 is in normal operation, the driving gear 110 rotates with the nominal speed along the releasing direction, for example, counter-clockwise rotation, and the engagement between the pawl 112 and the ratchet 122 is released. The nominal speed of the driving gear 110 is the rotating speed when the electronic device 10 performs normal operations, such as photo-copying, scanning, printing, etc. In the present embodiment, the nominal speed is between 30 rpm and 50 rpm which is way below 99 RPM. Therefore, after the pawl 112 and the ratchet 122 disengaged, the driving gear 110 can rotate in both the driving direction and the releasing direction with the nominal speed to perform the normal operation and the driven gear 120 is not driven by the driving gear 110, and the elastic member 114 is configured to apply the elastic force to the pawl 112 to maintaining the pawl 112 at the nominal position. It is noted that, the centrifugal force depends on the size and rotating speed of the driving gears 110, so the critical driving speed may change according to the size of the driving gear 110. The present invention is not limited herein.

In summary, the present invention provides the driven gear can only be driven by the driving gear when the driving gear rotates with certain driving speed, so as to avoid the driven gear driven by the driving gear accidentally and causes the paper jam or operation error of the electronic device. Moreover, the elastic member configured to maintain the pawl of the driving gear at the nominal position when the driven gear is not driven by the driving gear is disposed in the slot of the driving gear, so no extra volume is added, and the size of the gear assembly can remain compact. Therefore, the present invention not only can avoid paper jam or operation error of the electronic device, but also maintain the compact size of the gear assembly and the electronic device using the gear assembly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gear assembly, comprising:
    a driving gear, adapted to rotate about an axis, and the driving gear comprising:
        at least one pawl, pivoted on a first surface of the driving gear; and
        at least one elastic member, respectively disposed in at least one slot of the driving gear, wherein one end of the elastic member is fixed in the slot and another end of the elastic member is connected to the pawl; and
    a driven gear, comprising a ratchet having a plurality of teeth and disposed on a second surface facing the first surface, wherein the ratchet is adapted to be engaged with the pawl,
    when the driving gear rotates with a driving speed along a driving direction, a centrifugal force is generated to drive the pawl to move from a nominal position to a clutching position, such that the at least one pawl is engaged with the at least one tooth of the ratchet and drives the driven gear to rotate with the driving gear, when the driving gear rotates with a nominal speed slower than the driving speed along a releasing direction opposite to the driving direction, the engagement between the pawl and the ratchet is released and the pawl is back to the nominal position so the driven gear does not rotate with the driving gear.

2. The gear assembly as claimed in claim 1, wherein the driving speed is between 99 rpm and 110 rpm.

3. The gear assembly as claimed in claim 1, wherein the nominal speed is between 30 rpm and 50 rpm.

4. The gear assembly as claimed in claim 1, wherein after the pawl is engaged with the ratchet, the rotating speed of the driving gear is decreased from the driving speed to the nominal speed while the driving gear keeps on rotating along the driving direction, and the pawl is remain engaged with the ratchet.

5. The gear assembly as claimed in claim 1, further comprises a driven pivot, wherein the driven pivot is connected to the driven gear such that the driven pivot rotates with the driven gear.

6. The gear assembly as claimed in claim 5, wherein the driving gear further comprises a first through hole and the driven gear further comprises a second through hole and a lock part, the driven pivot is engaged with the first through hole and the second through hole respectively and is locked with the lock part, such that the driven pivot rotates with the driven gear.

7. The gear assembly as claimed in claim 6, wherein the driven pivot comprises a groove and the driving gear comprises a bump disposed on an inner wall of the first through hole and engaged with the groove, such that the bump moves along the groove when the driving gear rotates relatively to the driven gear.

8. The gear assembly as claimed in claim 6, wherein the driving gear comprises a groove disposed around an inner wall of the first through hole and the driven pivot comprises a bump engaged with the groove, such that the bump moves along the groove when the driving gear rotates relatively to the driven gear.

9. The gear assembly as claimed in claim 1, wherein the driving gear further comprises a top stopper and a bottom stopper, wherein when the pawl is driven to move to the clutching position, the pawl leans against the top stopper to keep the pawl engaged with the ratchet, when the pawl is back to the nominal position, the pawl leans against the bottom stopper to keep the pawl remaining at the nominal position.

10. The gear clutch assembly as claimed in claim 1, wherein the diameters of the driving gear and the driven gear both are about 30 mm.

11. An electronic device, comprising:
    a body; and
    a paper feed module, disposed in the body, comprising:
        a paper tray, adapted to stack papers thereon;
        a paper feed path, connected to the paper tray; and
        a gear assembly, disposed on the paper feed path, comprising:
            a driving gear, adapted to rotate along an axis, and the driving gear comprising:
                at least one pawl, pivoted on a first surface of the driving gear; and
                at least one elastic member, respectively disposed in at least one slot of the driving gear, wherein one end of the elastic member is fixed in the slot and another end of the elastic member is connected to the pawl; and
            a driven gear, comprising a ratchet having a plurality of teeth and disposed on a second surface facing the first surface, wherein the ratchet is adapted to be engaged with the pawl,
            when the driving gear rotates with a driving speed along a driving direction, a centrifugal force is generated to drive the pawl to move from a nominal position to a clutching position, such that the at least one pawl is engaged with the at least one tooth of the ratchet and drives the driven gear to rotate with the driving gear, when the driving gear rotates with a nominal speed slower than the driving speed along a releasing direction opposite to the driving direction, the engagement between the pawl and the ratchet is released, and the pawl is back to the nominal position so the driven gear does not rotate with the driving gear.

12. The electronic device as claimed in claim 11, wherein the driving speed is between 99 rpm and 110 rpm.

13. The electronic device as claimed in claim 11, wherein the nominal speed is between 30 rpm and 50 rpm.

14. The electronic device as claimed in claim 11, wherein after the pawl is engaged with the ratchet, the rotating speed of the driving gear is decreased from the driving speed to the nominal speed while the driving gear keeps on rotating along the driving direction, and the pawl is remain engaged with the ratchet.

15. The electronic device as claimed in claim 11, the gear assembly further comprises a driven pivot, wherein the driven pivot is connected to the driven gear such that the driven pivot rotates with the driven gear.

16. The electronic device as claimed in claim 15, wherein the driving gear further comprises a first through hole and the driven gear further comprises a second through hole and a lock part, the driven pivot is engaged with the first through hole and the second through hole respectively and is locked with the lock part, such that the driven pivot rotates with the driven gear.

17. The electronic device as claimed in claim 16, wherein the driven pivot comprises a groove and the driving gear comprises a bump disposed on an inner wall of the first through hole and engaged with the groove, such that the bump moves along the groove when the driving gear rotates relatively to the driven gear.

18. The electronic device as claimed in claim 16, wherein the driving gear comprises a groove disposed around an inner wall of the first through hole and the driven pivot comprises a bump engaged with the groove, such that the bump moves along the groove when the driving gear rotates relatively to the driven gear.

19. The electronic device as claimed in claim 11, wherein the driving gear further comprises a top stopper and a bottom stopper, wherein when the pawl is driven to move to the clutching position, the pawl leans against the top stopper to keep the pawl engaged with the ratchet, when the pawl is back to the nominal position, the pawl leans against the bottom stopper to keep the pawl from touch the driven pivot.

20. The electronic device assembly as claimed in claim 11, wherein the diameters of the driving gear and the driven gear both are about 30 mm.

* * * * *